US012693712B2

(12) United States Patent
Sung et al.

(10) Patent No.: US 12,693,712 B2
(45) Date of Patent: Jul. 28, 2026

(54) DETACHABLE KEYBOARD AND STAND WITH STRAP HINGE

(71) Applicant: Intel Corporation, Santa Clara, CA (US)

(72) Inventors: Gavin Sung, Taipei (TW); Mallari C. Hanchate, Bangalore (IN); Prasanna Pichumani, Bangalore (IN); Prakash Kurma Raju, Bangalore (IN); Tim Liu, Taipei City (TW)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/861,016

(22) Filed: Jul. 8, 2022

(65) Prior Publication Data

US 2022/0413547 A1      Dec. 29, 2022

(51) Int. Cl.
| | |
|---|---|
| *G06F 1/16* | (2006.01) |
| *H02J 50/10* | (2016.01) |
| *H04W 4/80* | (2018.01) |

(52) U.S. Cl.
CPC ............ *G06F 1/166* (2013.01); *G06F 1/1681* (2013.01); *H02J 50/10* (2016.02); *H04W 4/80* (2018.02); *G06F 2200/1632* (2013.01)

(58) Field of Classification Search
CPC ...... G06F 1/1632; G06F 1/166; G06F 1/1669; G06F 1/1681; A45C 2200/15; A45C 11/00; A45C 11/001; A45C 11/002; A45C 11/003
USPC .................................................. 16/221, 226
See application file for complete search history.

(56) References Cited

U.S. PATENT DOCUMENTS

| | | | | | |
|---|---|---|---|---|---|
| 667,838 | A | * | 2/1901 | Wyman ..................... | E05D 1/02 |
| | | | | | 12/136 R |
| 1,055,516 | A | * | 3/1913 | Carter ....................... | E05D 1/02 |
| | | | | | 16/226 |
| 3,938,831 | A | * | 2/1976 | Herman ................... | B42D 3/02 |
| | | | | | 16/226 |
| 4,185,934 | A | * | 1/1980 | Hodson ................... | B42F 13/20 |
| | | | | | 402/80 L |
| 4,369,715 | A | * | 1/1983 | Ingersoll ................... | A47F 5/10 |
| | | | | | 108/2 |
| 4,636,065 | A | * | 1/1987 | Kanemitsu ................ | E05D 1/02 |
| | | | | | 355/75 |
| 5,860,550 | A | * | 1/1999 | Miller .................... | B65D 25/54 |
| | | | | | 220/4.23 |
| 7,469,451 | B2 | * | 12/2008 | Hashizume ........... | G06F 1/1683 |
| | | | | | 16/225 |

(Continued)

OTHER PUBLICATIONS

Extended European Search Report mailed Nov. 11, 2023 for European Patent Application No. 23176182.6, 13 pages.

*Primary Examiner* — Adrian S Wilson
(74) *Attorney, Agent, or Firm* — Banner & Witcoff, Ltd.

(57) ABSTRACT

A cover for a tablet or similar computer device equipped with strap hinges is disclosed. In embodiments, the cover may include three strap hinges to allow the tablet to be placed in several different configurations. The cover is equipped with at least two magnets in different polarities, which may be detected by the tablet. Based on the detection of at least one magnet and its polarity, the tablet may cause the interface of its operating system to be placed into a configuration appropriate to the configuration of the cover. Other embodiments may be described and/or claimed.

20 Claims, 6 Drawing Sheets

(56) References Cited

U.S. PATENT DOCUMENTS

| | | | | |
|---|---|---|---|---|
| 7,685,676 | B2 * | 3/2010 | Mc Clellan | E05D 1/02 |
| | | | | 16/221 |
| 7,945,995 | B1 * | 5/2011 | Gates | F21V 15/01 |
| | | | | 362/362 |
| 8,467,186 | B2 * | 6/2013 | Zeliff | G06F 1/1632 |
| | | | | 345/169 |
| 9,075,566 | B2 * | 7/2015 | Whitt, III | G06F 1/166 |
| 9,720,453 | B2 * | 8/2017 | Nelson | B32B 7/14 |
| 10,031,557 | B1 * | 7/2018 | Morrison | G06F 1/189 |
| 10,532,428 | B2 * | 1/2020 | Russell-Clarke | B23K 26/38 |
| 10,641,320 | B2 * | 5/2020 | Lee | F16C 11/12 |
| 11,340,659 | B2 * | 5/2022 | Wang | G06F 1/1656 |
| 11,429,144 | B2 * | 8/2022 | Chuang | G06F 1/1607 |
| 11,449,108 | B2 * | 9/2022 | Li | H04M 1/0216 |
| 11,455,016 | B2 * | 9/2022 | Ku | G06F 3/023 |
| 11,531,405 | B2 * | 12/2022 | Thome | G06F 1/169 |
| 11,609,612 | B2 * | 3/2023 | Park | G06F 1/1677 |
| 11,662,777 | B2 * | 5/2023 | Ku | G06F 1/1662 |
| | | | | 345/158 |
| 11,703,907 | B2 * | 7/2023 | Moon | G06F 1/1662 |
| | | | | 361/679.1 |
| 2004/0266502 | A1 * | 12/2004 | Holtorf | B32B 27/06 |
| | | | | 428/156 |
| 2008/0232061 | A1 * | 9/2008 | Wang | G06F 1/1632 |
| | | | | 361/679.41 |
| 2008/0257006 | A1 * | 10/2008 | Durney | B21D 5/00 |
| | | | | 72/379.2 |
| 2009/0307871 | A1 * | 12/2009 | Hung | E05D 5/14 |
| | | | | 16/226 |
| 2012/0110784 | A1 * | 5/2012 | Hsu | H04M 1/0216 |
| | | | | 16/225 |
| 2013/0301206 | A1 * | 11/2013 | Whitt, III | G06F 3/0414 |
| | | | | 361/679.28 |
| 2016/0048363 | A1 | 2/2016 | North et al. | |
| 2016/0366997 | A1 * | 12/2016 | Sirichai | A45C 11/00 |
| 2018/0210507 | A1 * | 7/2018 | Morrison | G06F 1/203 |
| 2019/0121399 | A1 * | 4/2019 | Ku | G06F 1/1677 |
| 2020/0301480 | A1 | 9/2020 | Miller et al. | |
| 2020/0333841 | A1 | 10/2020 | Moon et al. | |
| 2021/0099025 | A1 | 4/2021 | Gaule et al. | |
| 2021/0208635 | A1 * | 7/2021 | Wang | G06F 3/0383 |
| 2021/0365065 | A1 * | 11/2021 | Chuang | G06F 1/1656 |
| 2021/0372177 | A1 * | 12/2021 | Miller | B32B 27/304 |
| 2022/0019266 | A1 * | 1/2022 | Park | G06F 1/1681 |
| 2022/0091640 | A1 | 3/2022 | Vassberg | |
| 2022/0404862 | A1 * | 12/2022 | Raju | G06F 1/1637 |
| 2023/0026512 | A1 * | 1/2023 | Hanchate | H05K 5/0226 |
| 2023/0045113 | A1 * | 2/2023 | Ku | G06F 1/1647 |

* cited by examiner

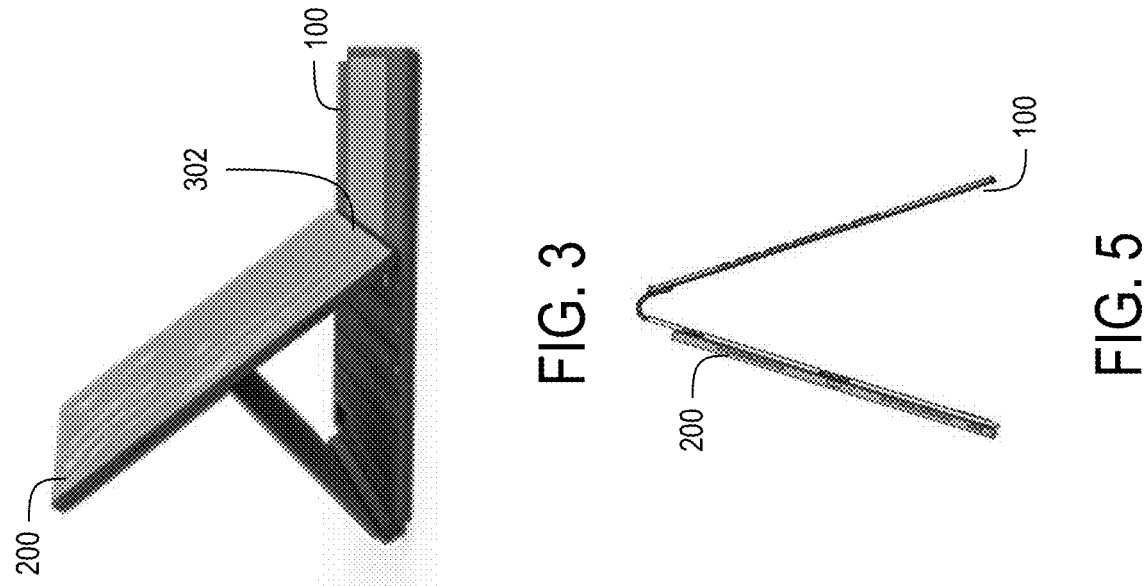
FIG. 2
FIG. 3
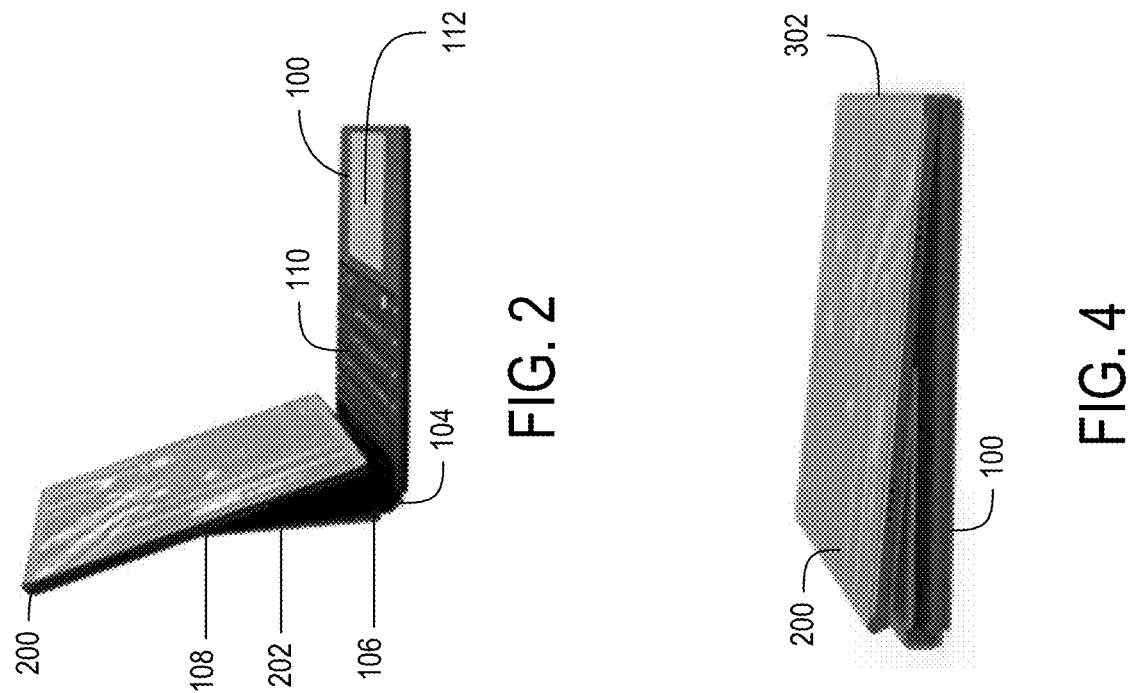
FIG. 4
FIG. 5

FIG. 6C
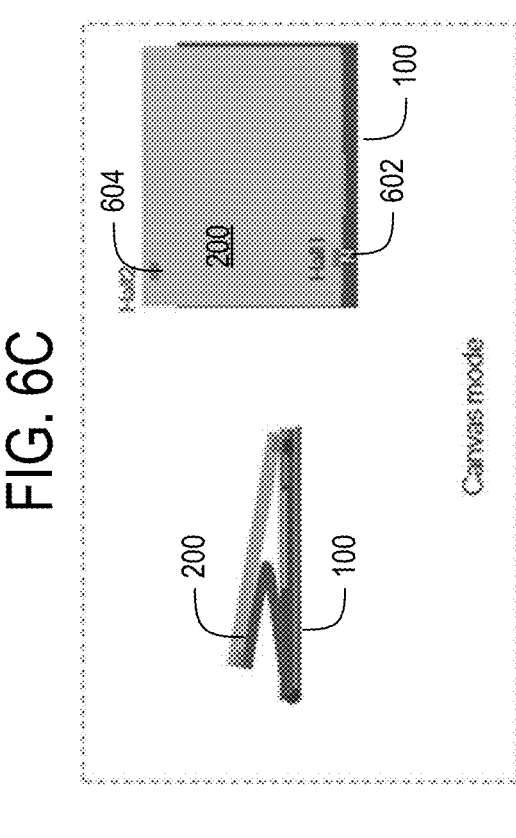
Canvas mode
FIG. 6A
clamshell mode
FIG. 6D
Closed L10 mode
FIG. 6B
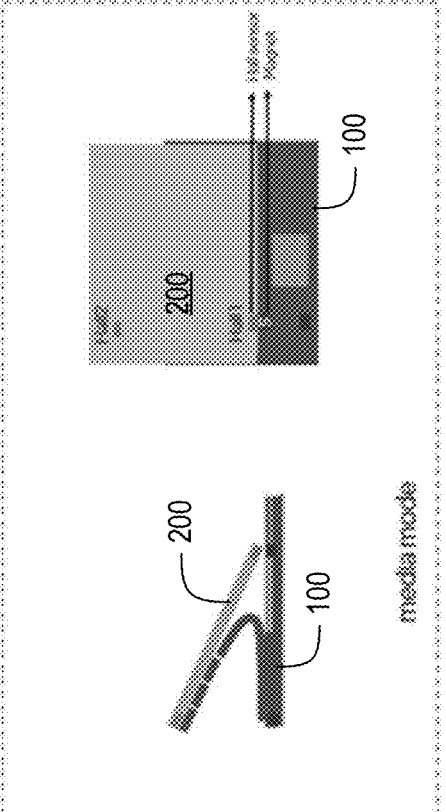
media mode

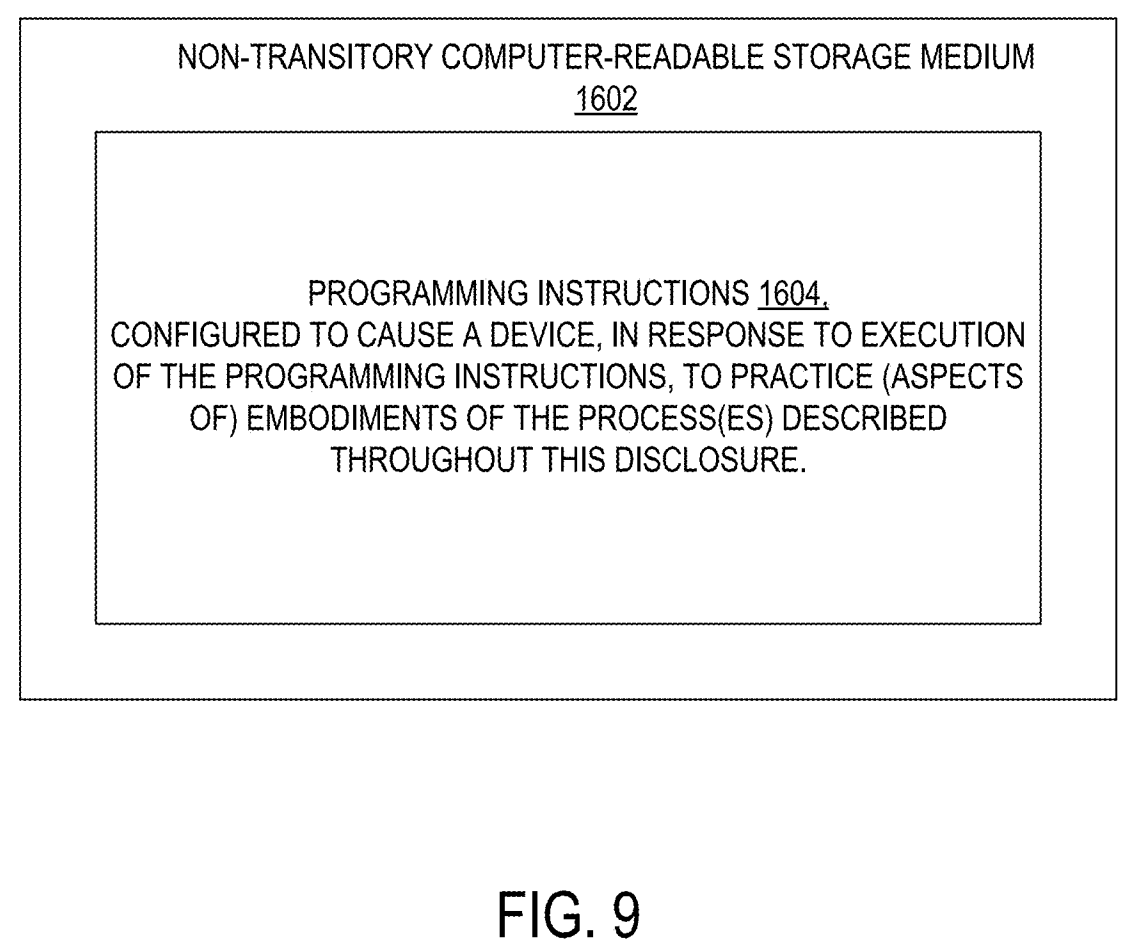

NON-TRANSITORY COMPUTER-READABLE STORAGE MEDIUM
1602

PROGRAMMING INSTRUCTIONS 1604,
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 9

DETACHABLE KEYBOARD AND STAND WITH STRAP HINGE

TECHNICAL FIELD

Disclosed embodiments are directed to detachable stands for tablet computers, and specifically, for detachable stands with a strap hinge and integrated sensors to detect stand configuration.

BACKGROUND

Tablets, which integrate computing hardware into an enclosure that primarily contains a screen, have become a popular form factor for computing platforms. Being essentially a large screen in a housing, tablets principally rely upon touch screen interfaces for interaction. By itself, a tablet generally provides a light-weight, space-minimizing, and portable computing platform that can be carried in a backpack, brief case, purse, or file folder, for example. Furthermore, tablets are increasingly being equipped with processors that offer power comparable to a conventional clam-shell style laptop, or even desktop computers, enabling them to run a full suite of applications that would normally be found on a more conventional computing platform, such as a laptop or desktop.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 2 illustrates the example cover of FIG. 1 equipped to a computer device in a laptop configuration, according to various embodiments.

FIG. 3 illustrates the example cover of FIG. 1 equipped to a computer device in a media viewing mode, according to various embodiments.

FIG. 4 illustrates the example cover of FIG. 1 equipped to a computer device in a canvas mode, according to various embodiments.

FIG. 5 illustrates the example cover of FIG. 1 equipped to a computer device in a tent mode, according to various embodiments.

FIGS. 6A-D illustrate the interaction of magnets embedded in the example cover of FIG. 1 with hall sensors equipped to the computer device, according to various embodiments.

FIG. 9 is a block diagram of a computer-readable storage medium that can be used to implement some of the components of the system or methods disclosed herein, according to various embodiments.

DETAILED DESCRIPTION

Figure 1:
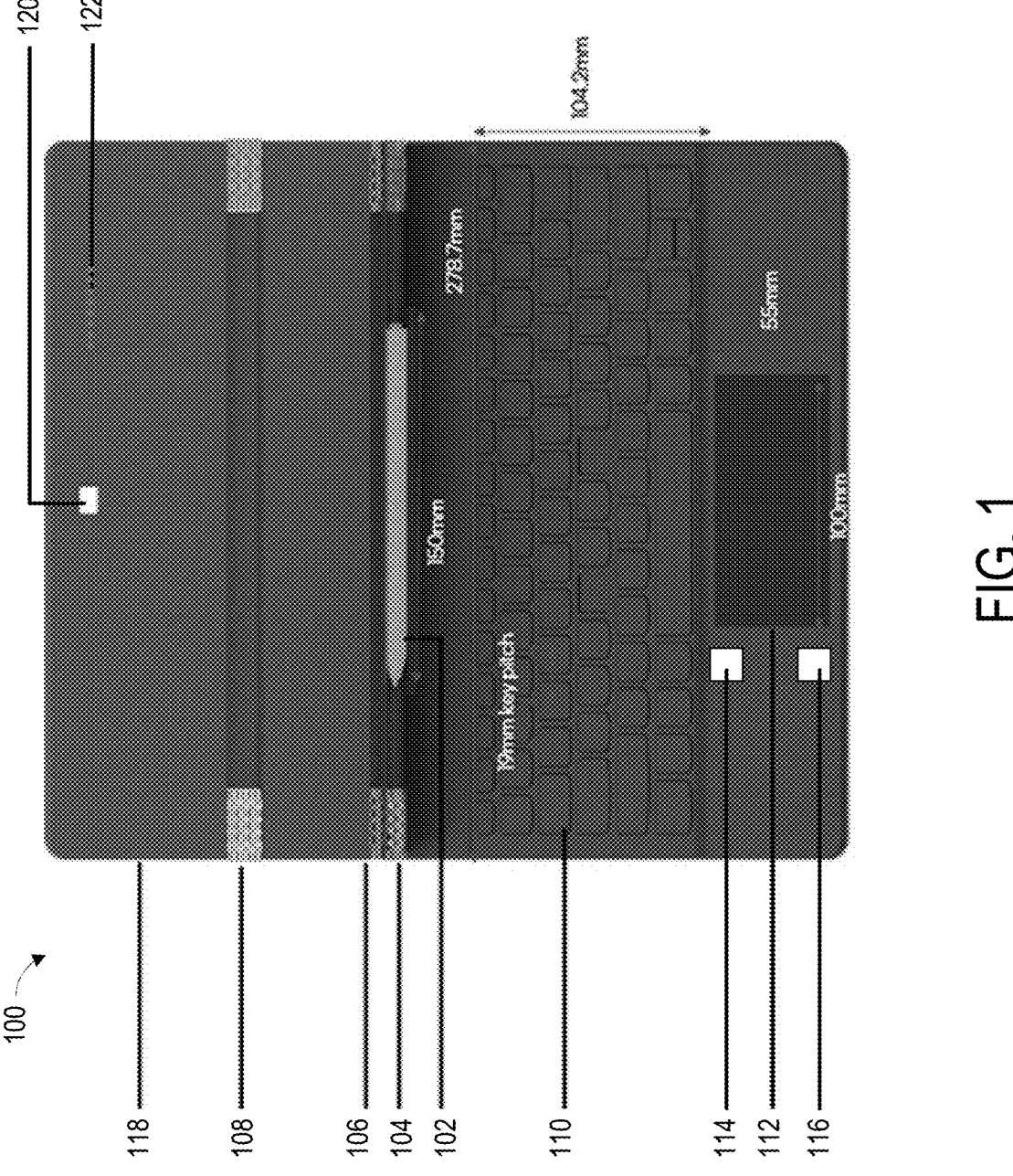
FIG. 1 illustrates an example detachable cover for a computer device, according to various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Tablets, in their native form factor, typically lack any substantial external interface for user input, instead relying upon a touchscreen and an operating system oriented around a touch interface for user interaction. Applications supported by a given tablet are likewise typically written to utilize the tablet's default touch interface, often by employing libraries and interface elements exposed by the operating system. Such interface elements may include virtual representations of physical interfaces, such as on-screen keyboards that mimic the layout of a physical keyboard.

However, the interfaces of many applications commonly used for business and productivity are typically written to work with a physical keyboard and pointing device, such as a mouse or trackpad. Also, some applications are better suited to use with an external physical interface by nature of the work for which they are designed. In word processing, for example, using a physical keyboard for projects that require significant typing is preferable to a virtual keyboard. Other applications, such as graphic design, may benefit from the use of an external pointing device such as a mouse or trackpad, or an external device that interfaces with the touchscreen such as a stylus. To help harness the processing power of modern tablets and facilitate the use of applications engineered for more conventional computing interfaces, a portable keyboard, which may also include a pointing device such as a trackpad and/or stylus, may be connected to a tablet.

Using a tablet for productivity with an external keyboard is typically facilitated if the tablet can be oriented relative to the keyboard in a fashion that approximates the arrangement of keyboard and screen found in a laptop or desktop configuration, viz. the keyboard is located in front of a screen that is relatively vertical or only slightly angled back from vertical. However, when not used for productivity purposes, tablets may be used as media consumption devices, e.g. watching videos, browsing the web, reading books, etc. Such interactions may benefit from a different viewing angle than the arrangement employed for productivity. Media such as videos may be preferably viewed at an angle between 45 to 60 degrees from horizontal. Still further, some productivity applications may be effectively utilized at a near-flat or horizontal orientation, such as graphic design applications where a stylus is used to directly interact with on-screen images.

Many tablets include motion sensors such as accelerometers to detect the orientation of the device, e.g. whether the device is held in portrait or landscape orientation, and whether the device is right side up or upside down. Further, some operating systems that run on tablets support different interface modes, such as a tablet mode with larger interface elements to facilitate use of the touchscreen, desktop mode with a more conventional interface better suited to use with an external keyboard and pointing device, and/or a cinema or media consumption mode, which may provide a greatly simplified interface geared to viewing videos in a full-screen format. Typically, such modes may be selected by a user via an operating system interface or other control and/or may be automatically selected by launching certain applications, e.g. launching a media player or streaming video application may prompt the user or automatically switch the interface to a media consumption mode. However, it may be desirable to automatically reconfigure the interface based on the position of the tablet, as will be discussed herein.

Disclosed embodiments are directed to a detachable stand for a tablet or similar form-factor computer device. In some embodiments, the stand is equipped with multiple hinges to facilitate positioning an attached tablet in several different use positions, such as a laptop mode, a media consumption mode, and a canvas mode. Furthermore, in some embodiments the cover may be equipped with one or more magnets positioned such that when detected by a tablet equipped with an appropriate sensor, the tablet will automatically switch to an interface mode appropriate to the stand's current use position. Other embodiments may include a charging well for wirelessly charging an accessory such as a stylus.

FIG. 1 illustrates an example cover 100 that can be detachably equipped to a tablet (not illustrated), which may be a computer device 1500, described below with respect to FIG. 7, according to various embodiments. The cover 100, in the depicted embodiment, includes a first strap hinge 104, second strap hinge 106, and third strap hinge 108, as well as a keyboard 110, pointing device 112, and stylus 102. Opposite the keyboard 110 and pointing device 112, and tying together the first, second, and third stap hinges 104, 106, and 108, is a protective flap 118. The cover 100 is detachably retained to a tablet by one or more magnets 120, which may be attracted to counterpart magnet(s) embedded within the tablet, or a ferrous area(s) on part of the tablet. The protective flap 118 may be manufactured from any suitable material, such as leather, plastic, cloth, or wood, or another appropriate material or mix of materials. The surface of the protective flap 118 that contacts the tablet may be equipped with a suitably soft or non-scuffing material, such as velvet or microfiber, or another suitable surface.

Strap hinges 104, 106, and 108 may be constructed at least partially from a metal material, such as a braided metal band or strap. Each of the strap hinges 104, 106, and/or 108 may be configured to provide some resistance to bending, such that each hinge will retain a particular angle in which it is placed against the weight of the laptop. When so configured, the cover 100 may be placed in one of several positions, and will retain the position until forcibly moved by a user. Examples of various positions will be described below with respect to FIGS. 2-5. Depending upon the geometry of a given position and the potential maximum weight of any tablet to which the cover 100 may be attached, the keyboard portion of the cover 100 may need to be counterweighted to provide adequate stability in use.

In the depicted embodiment, the tablet connects to the cover 100 via a pogo pin connector 122, which electrically engages corresponding contacts on the tablet. The pogo pin connector 122 thus provides communication between the tablet and keyboard 110 and pointing device 112. The connector 122 further supplies power from the tablet for wirelessly charging stylus 102 via wireless charging circuitry incorporated into cover 100. Pogo pin connector 122, as the name indicates, comprises one or more spring-loaded metallic pins that securely contact a corresponding set of contact pads on an attached tablet. The location of pogo pin connector 122 illustrated in FIG. 1 is for example only; as will be understood, the location of connector 122 may vary depending upon the specifics of a given implementation of cover 100 and a correspondingly equipped tablet. As can be seen in the depicted embodiment of FIG. 1, pointing device 112 is a trackpad or similar touch-sensitive surface. Keyboard 110 may be of any suitable design, and may employ any suitable keyboard mechanism that is appropriate for a given implementation. For example, a scissors or butterfly type mechanism may be employed to provide a low-travel keystroke where a thin cover 100 is desired.

Cover 100 further may include magnets 114 and 116, in embodiments. The magnets 114 and 116 are positioned to be detected by a hall sensor or similar suitable magnet detector or sensor which may be equipped to the tablet. To distinguish magnet 114 from magnet 116, the magnetic polarities of each magnet may be reversed from each other, viz. magnet 114 may be oriented with its north pole facing the keyboard side of the cover 100, and magnet 116 may be oriented with its south pole facing the keyboard side of the cover 100, or vice-versa. By detecting the orientation of either magnet 114 or magnet 116, a suitably equipped tablet can determine in which configuration cover 100 has been placed, and adjust the tablet interface as appropriate. This functionality will be described in greater detail below, with respect to FIG. 5.

Turning to FIGS. 2-5, several examples of different configurations of a cover 100 attached to a tablet 200 are depicted, according to various embodiments. FIG. 2 depicts an example laptop configuration. As can be seen, the attached tablet 200 is at an angle somewhat less than vertical, as may be found in a laptop when open. The tablet 200 is not in contact with the keyboard 110 portion of cover 100, but rather is held at its open angle by resistance from the strap hinges equipped to cover 100, such as strap hinges 104, 106, and 108. First and second strap hinges 104 and 106, respectively, work in concert to create a nearly 90 degree angle in a riser portion 202 of cover 100 that raises tablet 200 above the plane of the keyboard 110, with third strap hinge 108 providing a tilt back of tablet 200. Furthermore, because the strap hinges provide sufficient resistance to hold their positions following adjustment, a user could adjust the angle of the various straps to place the tablet 200 at an angle best suited for the user's posture. For example, third strap hinge 108 could be folded until tablet 200 substantially contacted riser portion 202, with first and second strap hinges 104 and 106 being adjusted to a suitable angle, mimicking a convention clamshell-style laptop. Alternatively, riser portion 202 could remain in an approximately vertical orientation, and the tilt of tablet 200 could be adjust only using the third strap hinge 108.

It will be understood that adjusting a combination of first, second, and third strap hinges 104, 106, and/or 108 may allow the tablet 200 to be positioned and angled in a variety of configurations. Furthermore, from the laptop configuration of FIG. 2, the cover can be closed around the tablet 200 by bending first strap hinge 104 and second strap hinge 106 until the screen of tablet 200 is proximate to or in contact with keyboard 110 and pointing device 112.

FIG. 3 depicts tablet 200 in a media consumption configuration, where an edge 302 of tablet 200 is in contact with cover 100 between the keyboard 110 and the pointing device 112. First and second strap hinges 104 and 106 cooperate to create an approximately 45 degree angle for riser portion 202, while third strap hinge 108 allows tablet 200 to be positioned approximately orthogonal to riser portion 202, so that tablet 200 is oriented at approximately 45 to 60 degrees from the plane of keyboard 110. As can be seen, when in media consumption configuration, tablet 200 covers keyboard 110 while keeping pointing device 112 uncovered and accessible. While tablet 200 is being utilized for media consumption, it is unlikely that a user would need significant access to a keyboard over the pointing device 112, and the tilted back angle of tablet 200 may provide a more comfortable viewing angle for media for a user, such as when a user has tablet 200 and cover 100 in their lap. While tablet 200 is depicted as in contact with cover 100, it should be understood that first and second strap hinges 104 and 106 could be adjusted to raise edge 302 above the keyboard 110. Alternatively or additionally, third strap hinge 108 could be used independent of first and second strap hinges 104 and 106 to adjust the tilt of tablet 200 to an angle more suitable to a given user.

As mentioned above, when used for media consumption, tablet 200 may provide an interface that is optimized for media viewing, and as such will provide a virtual on-screen keyboard on occasions when a user may need access to typing, such as when searching for media to view. A user may optionally still use pointing device 112, which may be more useful for some operations such as quickly and precisely locating a desired media portion to view. Such functionality may be duplicated on tablet 200's touchscreen interface, depending on the specifics of a given implementation. The media consumption configuration may result from the laptop configuration by bending first strap hinge 104 and second strap hinge 106 towards a closed position, but bending third strap hinge 108 up away from the keyboard until edge 302 is proximate to between keyboard 110 and pointing device 112.

FIG. 4 depicts a tablet 200 attached to cover 100 in a canvas configuration, which may be suited to use of a stylus for drawing on the tablet 200 similar to how an artist would draw on a sketch pad. In the canvas configuration, first and second strap hinges 104 and 106 are bent until the edge 302 nearly contacts the edge of the cover 100, viz. the hinges approach a zero degree angle. Likewise, third strap hinge 108 is folded until tablet 200 is nearly or in contact with riser portion 202. As a result, tablet 200 is positioned at a substantially shallow angle, raised slightly by the combination of the bend created by first strap hinge 104 and second strap hinge 106 relative to the edge 302. Thus, tablet 200 is positioned for relatively easy interaction by a user with a stylus. The canvas configuration can result, starting from the media consumption configuration, if first and second strap hinges 104 and 106 are bent towards the keyboard 110 as if to close the cover over the tablet 200, but the third strap hinge 108 is bent up away from keyboard 110 until the edge of tablet 200 opposite to edge 302 is proximate to riser portion 202.

FIG. 5 depicts a tablet 200 in a tent position. The tent position, as will be understood by a person skilled in the art, is basically a variation of the laptop configuration depicted in FIG. 2. It may be obtained starting from either a closed configuration or the laptop configuration, but where the first strap hinge 104 and second strap hinge 106 are bent past 180 degrees to an acute angle. Third strap hinge 108 is not bent from its closed position. As a result, the screen of tablet 200 faces away from the tent, with the exterior of cover 100, when in closed configuration, facing inside the tent. Tent configuration may provide an alternative type of media consumption configuration, for when a viewing angle for tablet 200 that is closer to vertical is desired. As will be understood by a person skilled in the art, in tent configuration, the orientation of the screen of tablet 200 is upside-down compared to the orientation of tablet 200 in the configurations of FIGS. 2-4. Tablet 200 may detect this upside-down orientation using an accelerometer or other suitable sensor, as is known, and adjust the rotation of the operating system screen accordingly.

FIGS. 6A to D illustrate the function of the magnets 114 and 116 that interact with hall sensors 602 and 604, which may be equipped to tablet 200, according to various embodiments. A person skilled in the relevant art will understand that tablet 200 may be configured to detect the presence of cover 100 when attached, and selectively activate hall sensors 602 and 604 only when cover 100 is detected.

In FIG. 6A, the tablet 200 is in a clamshell mode, similar to the laptop configuration described above with respect to FIG. 2. As can be seen, in clamshell mode, hall sensor 602 is not proximate to either magnet 114 or 116, and so does not detect either. An operating system or other suitable application running on tablet 200 may assume, when hall sensor 602 does not detect a magnet, that the operating system interface should be placed in a laptop or desktop mode, as keyboard 110 and pointing device 112 are in position for use.

In FIG. 6B, the tablet 200 is in a media mode, similar to the media consumption configuration described above with respect to FIG. 3. In media mode, the hall sensor 602 is sufficiently proximate to magnet 114, positioned between the keyboard and pointing device, so that it can detect both the presence and polarity of magnet 114. Based on the detected polarity of the magnet 114, e.g. north or south-oriented, the operating system or application running on tablet 200 may place the operating system interface into a media consumption mode, as discussed above.

In FIG. 6C, the tablet 200 is in a canvas mode, similar to the canvas configuration depicted in FIG. 4 above. In canvas mode, the hall sensor 602 is sufficiently proximate to magnet 116, positioned between the edge of cover 100 and pointing device 112, so that it can detect both the presence and polarity of magnet 116. As described above, magnet 116 is oriented with an opposite polarity of magnet 114, so that hall sensor 602 can be used to distinguish between magnet 114 and magnet 116. Based on the detected polarity of the magnet 116, distinguished from magnet 114, the operating system or application running on tablet 200 may place the operating system interface into a canvas mode.

Finally, in FIG. 6D, the tablet 200 is in a closed lid mode, where the tablet 200 is sandwiched between cover 100 and the screen of tablet 200 faces the keyboard of the cover 100. In closed lid mode, second hall sensor 604, located on the edge of tablet 200 that is opposite to edge 302 (shown in FIGS. 3 and 4), is proximate to magnet 116. Detection of magnet 116 by second hall sensor 604 may cause the operating system or application of tablet 200 to place tablet 200 into a sleep mode, with the screen turned off, similar to if a power button was depressed on tablet 200. Depending on a given implementation, the detection of any magnet by second hall sensor 604 may result in the operating system or application of tablet 200 placing the tablet into sleep mode. In other embodiments, only detection of magnet 116 with its specific polarity, in contrast to detection of magnet 114, by second hall sensor 604 result in the tablet 200 being placed into sleep mode.

Although not depicted, the tent configuration depicted in FIG. 5 is essentially a variation of clamshell mode of FIG. 6A. As will be understood by a person skilled in the art, the tablet 200 would not detect either magnet 114 or 116 in a tent configuration, similar to clamshell mode. Tablet 200 may be configured to distinguish between clamshell mode and tent configuration by the use of an accelerometer to detect the orientation of tablet 200, in conjunction with detection of the presence of cover 100. In tent configuration, the tablet 200 would detect an inverted orientation compared to clamshell mode, which would indicate to the operating system or application of tablet 200 to configure the interface as appropriate for tent mode.

Figure 7:
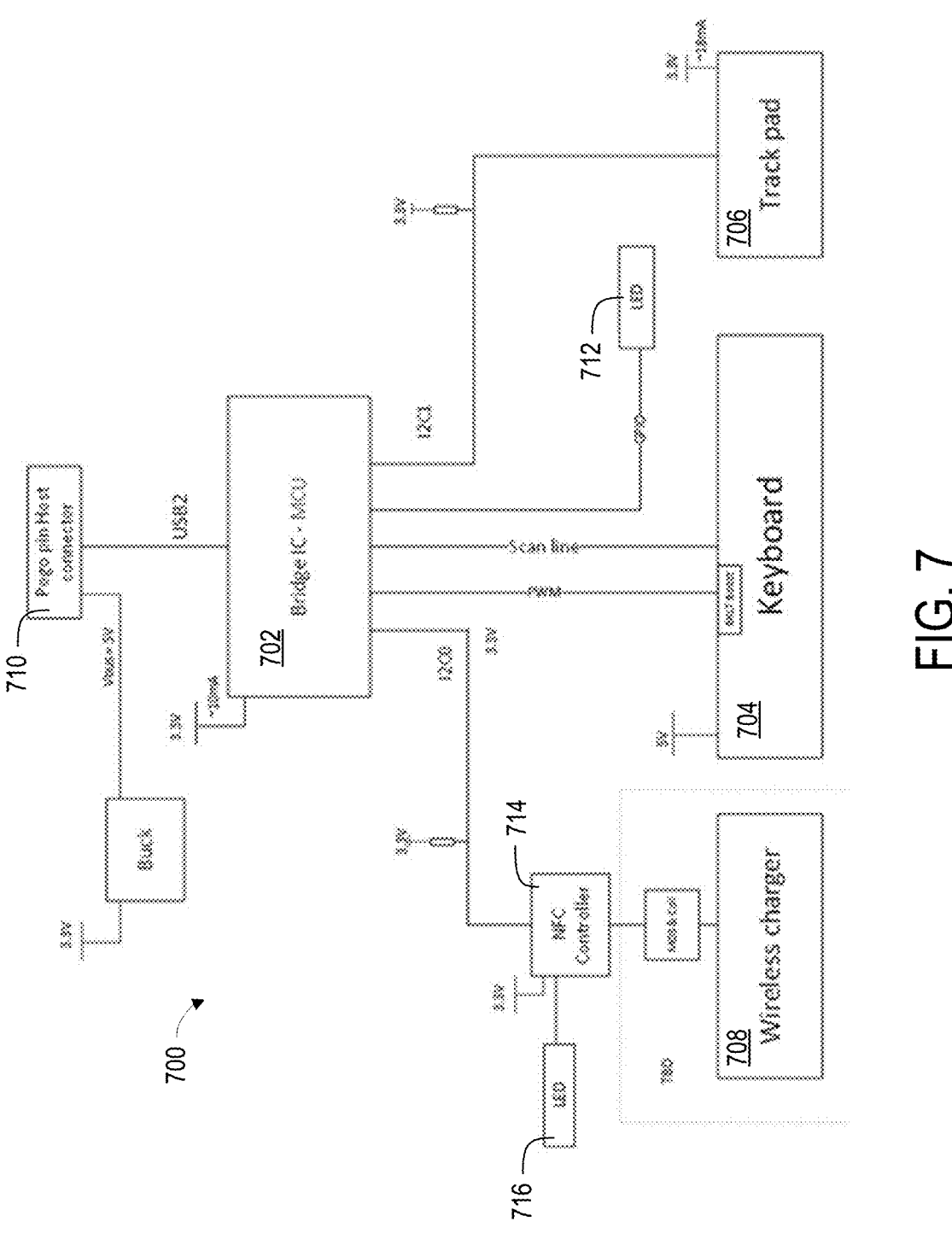
FIG. 7 illustrates a block diagram of example control circuitry that may be equipped to the example cover of FIG. 1, according to various embodiments.

In FIG. 7, a block diagram 700 of electronic components that may be present in an embodiment of cover 100 are depicted. Components of the example embodiment include a bridge integrated circuit (IC) 702, which is in communication with keyboard 704, track pad 706, wireless charger 708, and pogo pin connector 710. As will be understood, bridge IC 702 is responsible for properly routing signals over pogo pin connector 710 when a tablet 200 (not shown) is engaged to pogo pin connector 710. Bridge IC 702 may route keystrokes from keyboard 704 and movements from track pad 706 to tablet 200 via pogo pin connector 710. Such routing may include any necessary conversion or conditioning of signals from keyboard 704 and/or track pad 706 to make the signals compatible with tablet 200 and its operating system.

Bridge IC 702, in embodiments, may be implemented as a microcontroller unit, which may include any necessary firmware or software for enabling bridge IC 702 to carry out its necessary functions. In other embodiments, bridge IC 702 may be implemented using discrete components, a field-programmable gate array, an ASIC, a combination of the foregoing, or any other suitable technology now known or later developed. Depending on the specifics of a given implementation, bridge IC 702 may be specifically configured or tailored to interface with a particular tablet 200 or class of tablets. In some embodiments, bridge IC 702 may be configured to allow cover 100 to interface with different types of tablet 200, such as tablets of varying models from different manufacturers. In such implementations, bridge IC 702 may be configured to detect a type of tablet connected to cover 100, and convert signals from keyboard 704 and/or track pad 708 to signals appropriate for the detected type of tablet. In other embodiments, bridge IC 702 may convert keyboard and track pad signals into a USB format, such as USB2, to enable more universal compatibility with any tablet that can interface with pogo pin connector 710.

Bridge IC 702 may also communicate with an LED 712, for purposes of status indication, in some embodiments. LED 712 may be useful for indicating the status of cover 100, such as whether it is receiving power and/or if keyboard 704 and track pad 706 are active and accepting input for an attached tablet. LED 712, in embodiments, could be used for other signaling functions, such as whether caps lock or number lock is engaged. In still other embodiments, LED 712 may be a plurality of LEDs. LED 712 may partially comprise a keyboard backlight in some embodiments.

Bridge IC 702, in embodiments, may provide power to a wireless charger 708, for wirelessly charging an external device such as a stylus. Bridge IC 702 may communicate with wireless charger 708 via a near-field communication (NFC) controller 714, which may enable communication with stylus to receive information such as stylus orientation and movement, and/or detection of interaction with the tablet screen. Other NFC-equipped devices, other than a stylus, may also communicate via NFC controller 714 NFC controller 714 further may be connected to an LED 716, to provide status information about the NFC controller 714 and/or any device being charged by wireless charger 708. For example, LED 716 may be used to indicate the charging status of a stylus placed near the wireless charger 708, such as whether the stylus is currently charging, is fully charged, and/or where the stylus is in the charging process (e.g. partially charged, nearly charged, fully charged, etc.).

Figure 8:
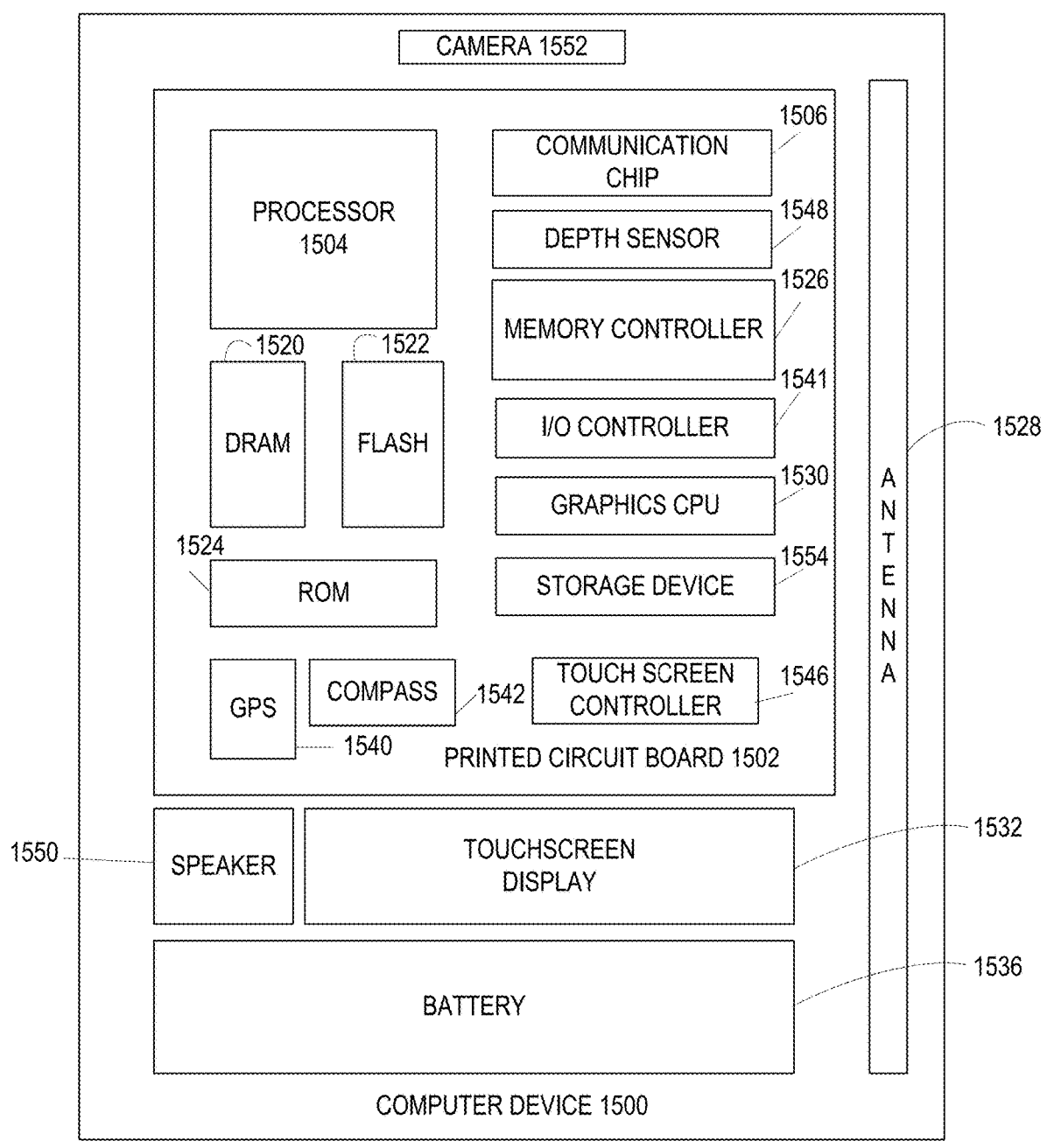
FIG. 8 is a block diagram of an example computer that can be used to implement some or all of the components of the disclosed systems and methods, according to various embodiments.

FIG. 8 illustrates an example computer device 1500 that may be employed by the apparatuses and/or methods described herein, in accordance with various embodiments. As shown, computer device 1500 may include a number of components, such as one or more processor(s) 1504 (one shown) and at least one communication chip 1506. In various embodiments, one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a depth sensor 1548, a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects of FIGS. 6A-D and/or other aspects described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) FIGS. 6A-D and/or other aspects described above. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

EXAMPLES

The following examples pertain to further embodiments.

Example 1 is a detachable stand for a computer device, comprising a hinge frame; first, second, and third strap hinges; an input device; a connector; and a magnet, wherein the detachable stand may be positioned between a closed position, a first position, and a second position, and detachably connects to the computer device by the connector, and is retained to the computer device with the magnet.

Example 2 includes the subject matter of example 1, or some other example herein, wherein the connector is a pogo pin connector.

Example 3 includes the subject matter of example 1 or 2, or some other example herein, wherein the input device is a keyboard, a pointing device, or both.

Example 4 includes the subject matter of any of examples 1-3, or some other example herein, wherein the magnet is a first magnet, and further comprising a second magnet and a third magnet; the second magnet has a different polarity orientation from the third magnet; the second magnet is positioned so that it is in proximity to the computer device when the detachable stand is in the first position; and the third magnet is positioned so that it is in proximity to the computer device when the detachable stand is in the second position.

Example 5 includes the subject matter of any of examples 1-4, or some other example herein, wherein the first strap hinge is configured to provide a well for a stylus.

Example 6 includes the subject matter of example 5, or some other example herein, wherein the stylus well is further configured to wirelessly charge a stylus when the detachable stand is attached to the computer device and a stylus is placed in the well.

Example 7 includes the subject matter of any of examples 1-6, or some other example herein, further comprising bridge circuitry connecting the input device to the connector.

Example 8 includes the subject matter of example 7, or some other example herein, wherein the bridge circuitry comprises a microcontroller.

Example 9 includes the subject matter of any of examples 1-8, or some other example herein, wherein an attached computer device covers at least a part of the input device when the detachable stand is configured in at least one of the first position and second position.

Example 10 is a system, comprising a computer device; and a stand to detachably accept the computer device, wherein the stand comprises first, second, and third strap hinges, the first, second, and third strap hinges to cooperate to retain the computer device, when attached to the stand, in a desired orientation; a keyboard; a pointing device; and a plurality of magnets.

Example 11 includes the subject matter of example 10, or some other example herein, wherein the computer device comprises a tablet.

Example 12 includes the subject matter of example 11, or some other example herein, wherein the tablet is retained to the stand by one of the plurality of magnets.

Example 13 includes the subject matter of example 11 or 12, or some other example herein, wherein the tablet, when attached to the stand, receives signals from the keyboard and pointing device over a pogo pin connector.

Example 14 includes the subject matter of any of examples 11-13, or some other example herein, wherein the plurality of magnets comprises a first magnet with an orientation and a second magnet with an orientation, the orientation of the first magnet is opposite the orientation of the second magnet, and the tablet comprises a hall sensor to detect the orientation of the first magnet and the orientation of the second magnet.

Example 15 includes the subject matter of any of examples 11-14, or some other example herein, further comprising a wireless charger, the wireless charger to wirelessly charge a stylus.

Example 16 includes the subject matter of example 15, or some other example herein, further comprising a near-field communication (NFC) controller in communication with the wireless charger, the NFC controller to communicate with the stylus.

Example 17 is a non-transitory computer-readable medium (CRM) comprising instructions that, when executed by a processor of a computer device, cause the computer device to detect a presence of a detachable cover, the detachable cover comprising three strap hinges, a keyboard, a track pad, and a plurality of magnets; receive, from the detachable cover, signals from the keyboard and the track pad; in response to detection of a polarity of a first one of the plurality of magnets, place an interface of the computer device into a first configuration; in response to detection of a polarity of a second one of the plurality of magnets, the polarity of the second one of the plurality of magnets being different than the polarity of the first one of the plurality of magnets, place the interface of the computer device into a second configuration; and in response to no detection of one of the plurality of magnets, place the interface of the computer device into a third configuration.

Example 18 includes the subject matter of example 17, or some other example herein, wherein the plurality of magnets are detected by a first sensor, and the instructions are to further cause the computer device to, in response to detection of one of the plurality of magnets by a second sensor, place the computer device in a sleep mode.

Example 19 includes the subject matter of example 18, or some other example herein, wherein the first sensor and second sensor are hall sensors.

Example 20 includes the subject matter of any of examples 17-19, or some other example herein, wherein the computer device is a tablet.

What is claimed is:

1. A detachable stand for a computer device, comprising: first, second, and third strap hinges; an input device; a connector; and a magnet, wherein the detachable stand is (i) configured to be positioned between a closed position, a first position, and a second position, (ii) configured to be detachably connected to the computer device by the connector, and (iii) retained to the computer device with the magnet, wherein the first, second, and third strap hinges comprise a braided metal band and are configured to provide resistance to bending to maintain a position and set angle against the weight of the computer device after being adjusted.

2. The detachable stand of claim 1, wherein the connector comprises a pogo pin connector.

3. The detachable stand of claim 1, wherein the input device comprises a keyboard and a pointing device.

4. The detachable stand of claim 1, wherein the magnet comprises a first magnet, and further comprising: a second magnet and a third magnet, and wherein: the second magnet has a different polarity orientation from the third magnet, the second magnet is positioned so that the second magnet is in proximity to the computer device when the detachable stand is in the first position, and the third magnet is positioned so that the third magnet is in proximity to the computer device when the detachable stand is in the second position.

5. The detachable stand of claim 1, wherein the first strap hinge is configured to provide a stylus well.

6. The detachable stand of claim 5, wherein the stylus well is further configured to wirelessly charge a stylus when the detachable stand is attached to the computer device and the stylus is placed in the stylus well.

7. The detachable stand of claim 1, further comprising: bridge circuitry configured to connect the input device to the connector.

8. The detachable stand of claim 7, wherein the bridge circuitry comprises a microcontroller.

9. The detachable stand of claim 1, wherein the computer device, when attached to the detachable stand, covers at least a part of the input device when the detachable stand is configured in the first position and/or the second position.

10. A system, comprising:
a computer device; and
a stand configured to detachably accept the computer device,
wherein the stand comprises:
first, second, and third strap hinges, the first, second, and third strap hinges comprise a braided metal band and are configured to cooperate to retain the computer device, when attached to the stand, in a set orientation;
a keyboard;
a pointing device; and
a plurality of magnets,
wherein the first, second, and third strap hinges are configured to provide resistance to bending to maintain, for the set orientation of the computer device, a position and set angle against the weight of the computer device after being adjusted.

11. The system of claim 10, wherein the computer device comprises a tablet.

12. The system of claim 11, wherein the tablet is retained to the stand by one of the plurality of magnets.

13. The system of claim 12, wherein the tablet, when attached to the stand, receives signals from the keyboard and pointing device over a pogo pin connector.

14. The system of claim 10, wherein:
the plurality of magnets comprise a first magnet having a first orientation and a second magnet having a second orientation, the first orientation of the first magnet being opposite to the second orientation of the second magnet, and
the computer device comprises a hall sensor configured to detect the first orientation of the first magnet and the second orientation of the second magnet.

15. The system of claim 11, further comprising:
a wireless charger configured to wirelessly charge a stylus.

16. The system of claim 15, further comprising:
a near-field communication (NFC) controller configured to be in communication with the wireless charger and to communicate with the stylus.

17. The detachable stand of claim 1, wherein the magnet comprises a first magnet, and further comprising:
a second magnet and a third magnet,
wherein the second magnet has a different polarity orientation from the third magnet to facilitate the computer device detecting the stand being in the first position or the second position.

18. The detachable stand of claim 1, wherein the magnet comprises a first magnet, and further comprising:
a second magnet and a third magnet, wherein:
the second magnet is positioned so that the second magnet is in proximity to the computer device when the detachable stand is in the first position,
the third magnet is positioned so that the third magnet is in proximity to the computer device when the detachable stand is in the second position, and
the second magnet is positioned so that the second magnet is not in proximity to the computer device when the detachable stand is in a third position.

19. The detachable stand of claim 1, wherein the first strap hinge and the second strap hinge cooperate to create a riser portion that supports the computer device at an elevated angle relative to a plane of the input device.

20. The detachable stand of claim 3, wherein the first, second, and third strap hinges are configured, when the detachable stand is in the first position, to raise the computer device above the keyboard and the pointing device.

* * * * *